United States Patent

Stram

[15] 3,645,764
[45] Feb. 29, 1972

[54] METHOD OF PRODUCING HIGH-STRENGTH CONSTRUCTION COMPOSITIONS OF A MIXTURE OF SOIL, PORTLAND CEMENT AND ASPHALT

[72] Inventor: Michael Stram, Chicago, Ill.
[73] Assignee: Sinclair Oil Corporation, New York, N.Y.
[22] Filed: Dec. 6, 1968
[21] Appl. No.: 781,961

[52] U.S. Cl. ..........................106/96, 106/281, 106/283, 106/287 SS
[51] Int. Cl. .......................................C04b 7/02
[58] Field of Search..........................106/96, 287 E

[56] References Cited

UNITED STATES PATENTS

| | | | |
|---|---|---|---|
| 3,281,256 | 10/1966 | Rogers et al. | 106/38.8 |
| 3,070,450 | 12/1962 | Bearden et al. | 106/96 |
| 2,927,402 | 3/1960 | Goren et al. | 47/58 |
| 2,899,330 | 8/1959 | Lyons | 106/287 |
| 2,780,557 | 2/1957 | Hardman et al. | 106/277 |
| 2,773,777 | 12/1956 | Alexander et al. | 106/96 |
| 2,379,082 | 6/1945 | James | 106/96 |
| 1,959,586 | 5/1934 | Kirschbraun | 106/96 |

*Primary Examiner*—Tobias E. Levow
*Assistant Examiner*—W. T. Scott
*Attorney*—Morton, Bernard, Brown, Roberts & Sutherland and Thomas J. Clough

[57] ABSTRACT

There are disclosed high-strength construction compositions comprising a mixture of soil, Portland cement and asphalt, and a method of producing such compositions. The wet compressive strength of compositions containing a mixture of soil and asphaltic binder is significantly increased by the addition of Portland cement.

8 Claims, No Drawings

METHOD OF PRODUCING HIGH-STRENGTH CONSTRUCTION COMPOSITIONS OF A MIXTURE OF SOIL, PORTLAND CEMENT AND ASPHALT

This invention is related to high-strength construction compositions comprised of a mixture of soil, Portland cement and asphaltic binder, and to a method of producing such compositions. More particularly, this invention is directed to high-strength construction compositions comprised of a mixture of soil, Portland cement and asphaltic binder, and to a method of producing such compositions for use in the manufacture of bricks and other related building materials, in which the wet compressive strength of such materials is increased by the addition of Portland cement.

The proper art discloses high-strength construction compositions consisting of a mixture of soil and asphaltic binders. These compositions, described, for instance, in U.S. Pat. No. 3,281,256, to D. I. Rogers et al., have a wet strength after curing which is consistently less than the dry strength. It has now been discovered by the present invention that the wet compressive strength of such compositions can be significantly increased by the addition of Portland cement to the soil and asphalt mixture.

The asphaltic binder employed in this invention can be selected from a variety of natural and industrial materials, including petroleum and natural asphalts. The petroleum asphalts which are suitable include asphalts obtained from California or Mid-Continent crude, from tar sands, Venezuelan or Mexican petroleum asphalt or combinations thereof. Other petroleum asphalts include those derived from the propane deasphalting and fractionation processes and asphaltic residue obtained by the vacuum distillation of petroleum hydrocarbon crude oils and other refining processes. These petroleum asphalts can be prepared from petroleum residual oils, often called asphalt bases or asphalt fluxes. The residual oils are obtained in the distillation of asphaltic crudes, for example, or by the fluxing of hard residual asphalts with heavy petroleum distillates.

Asphalts prepared from residual oils include straight reduced and oxidized asphalts. The straight reduced asphalts comprise the residue remaining after a crude oil has been subjected to distillation and fractionation to separate the lighter fractions, normally at atmospheric pressure and crude oil temperatures of 650°–800° F. Oxidized asphalts are produced by contacting an asphalt stock or flux with air at temperatures of 400°–450° F.

In addition to petroleum asphalts, various natural asphalts such as natural Trinidad, gilsonite and Cuban asphalts may be used. Other suitable binder materials include coal tars, wood tars and pitches from various industrial processes. The asphalt component of my composition comprises about 8 to 20 weight percent, preferably about 10 to 18 weight percent, based on the total product. The asphalts employed are essentially solid at ambient temperatures.

The soils employed in this invention are any of the finely divided earths and soils which may be readily compacted to give relatively solid structures. Particularly suitable are the finely divided clays and clay soils. All types of clay soils can be used, with the exception of the so-called expanding clays which swell in the presence of water, and include the montmorillonites (bentonites) and vermiculite. Aggregate materials other than earth and soil which may also be present in minor amounts in the compositions of this invention include finely divided coke, slag, cinder, iron ore, glass fibers, and the like and combinations of these materials. The soil component comprises about 50 to 90 weight percent, preferably about 60 to 85 weight percent, based on the total composition. The solid preferably employed have a particle size less than about 20 mesh. Soils which may be used in this invention include Houston black clay, Lakeland fine sand, New Jersey red soil, Georgia kaolin, Cecil coarse sandy loam and Chester silt loam.

The soil and the Portland cement particles are coated with asphalt by the process of this invention to provide resistance to water. Although the asphalt can be heated to fluid form and then combined with the coil and cement, one preferred manner of making my composition is to mix the asphalt with the soil-cement mixture with the asphalt being in the form of a solvent cutback using a volatile organic cutback solvent such as petroleum naphtha or other hydrocarbon solvent boiling in the range of about 175° to 600° F. The solvent should preferably be one that is substantially volatilized during the curing step, i.e., a solvent having a boiling point of less than about 600° F., or advantageously boiling primarily below about 400° F. In addition to petroleum naphtha, suitable solvents include toluene, benzene, xylene and halohydrocarbons such as carbon tetrachloride.

As previously mentioned, Portland cement is added to the soil and the soil-cement combination is mixed with the asphalt. The soil and cement can be separately coated with asphalt and then mixed or the soil and cement may be mixed and then incorporated into the asphalt. A random distribution of soil and cement is preferably employed in order to provide close compaction. The Portland cement comprises about 1 to 30 weight percent, preferably about 5 to 20 weight percent, based on the total composition. In compressing the asphalt-soil-cement mixture to obtain construction materials having high compression strength, the mixture should be compacted to a more dense form, for instance, to a density in the range of about 80 to 98 percent of the density of the mixture would have if there were no voids in the compacted structure, known as the theoretical density. A preferred range of densities is from about 85 to 95 percent of the theoretical. The required density can vary depending on such factors as asphalt concentration, composition temperature and curing conditions.

A precuring or hardening step prior to compaction can, if desired, be employed to obtain a more uniform coating of particles and to facilitate the development of a uniformly cured product while permitting the use of a shorter curing time. Mixing and the prehardening step can be carried out in a free oxygen-containing atmosphere, at temperatures in the range of about 150° to 500° F. for instance, a period in the range of about 1 minute to 5 hours. Preferred mixing and prehardening conditions include a temperature in the range of about 175° to 300° F. for a time period of about 2 minutes to 2 hours.

Curing of the compressed soil-cement-asphalt mixture at an elevated temperature is a necessary part in the development of high-strength materials. Curing may be accomplished by heating the composition either during or after compaction. It is important to maintain a free oxygen-containing atmosphere during the curing step as oxidation seems to aid in the formation of materials exhibiting high compressive strengths. This atmosphere can be either fluid or static. It is particularly desirable in mixing the various components that essentially moisture-free components be employed since the presence of excess water can cause vapor cracks to occur in the compacted material during the curing step. The curing step can be carried out employing elevated temperatures, for instance, in the range of about 250° to 500° F., preferably about 350° to 450° F., for, for instance, a time period in the range of about 2 to 100 hours, preferably about 15 to 40 hours. As previously mentioned, air among the free oxygen-containing gases is the preferred atmosphere.

The cured, compacted bricks or blocks manufactured from the compositions of this invention may be shipped or transported in the dry form or, alternatively, these construction materials may be subjected to water treatment to hydrate the cement and dried prior to shipment. This water treatment may be accomplished, for example, by immersion of the bricks in a water bath or by subjecting the bricks to a water spray.

In accordance with the method of this invention, the following compositions were prepared:

A soil sample taken from the ground at Harvey, Illinois, was oven dried at 120° F., until analytical tests showed 2 to 3 weight percent water. The dry dirt was then crushed and sifted through a 20-mesh screen. Portland cement was blended into the sifted soil at room temperature and the mixture was stirred into a solution containing about 50 percent by weight of asphalt in naphtha by means of a Ross two-bladed mixer. The resulting mixture was then heated for 1 hour at 200° F. under a laboratory vacuum of 120 millimeters of mercury to remove the solvent and to precure the mixture. The asphalt component employed had the properties as shown in Table I.

TABLE I

| Properties of Asphalt Component | |
|---|---|
| Test | Result |
| Specific gravity 60/60 | 1.025 |
| Penetration 77° F. | 87 |
| Softening Point | 115° F. |
| CCl₄ insolubles | 0.29 |
| Furol Viscosity 275° F. | 87.8 |
| Flash Point | 535° F. |

In accordance with the foregoing procedure, a construction composition (Composition A) was prepared containing 70 percent by weight of soil, 15 percent by weight of asphalt and 15 percent by weight of Portland Type I cement. A second composition (Composition B) was prepared without cement, this composition containing 85 percent by weight of soil and 15 percent by weight of asphalt.

In the case of both compositions, a dry, homogenous mixture was obtained. From each mixture, two 2-inch brick cubes were fashioned by compacting 250.0 grams of the solids-asphalt mixture at 2,500 pounds per square inch. These bricks were then cured at 425° F. for 23 hours after which they were soaked in water for 2 days, dried in air at 25° C. for 4 days and then tested for compressive strength. Table II lists the results of these tests for each of the bricks prepared from the two compositions.

TABLE II

| Sample | Compressive Strength, p.s.i. Composition A (w/Portland cement) | Composition B |
|---|---|---|
| Brick No. 1 | 800 | 0 |
| Brick No. 2 | 690 | 0 |

The bricks of Composition A (with Portland cement) were only moderately cracked and suffered only a slight loss in shape. The bricks of Composition B, however, were severely cracked and deformed. These latter bricks could be broken easily even by hand and thus could not be tested in a satisfactory manner for compressive strength.

It is claimed:

1. A process for the manufacture of construction compositions which consist essentially of:
   a. mixing about 50 to 90 weight percent of finely divided soil, about 1 to 30 weight percent of Portland cement and about 8 to 20 weight percent of asphalt, based on the weight of the total composition,
   b. hardening the resulting mixture by heating in a free oxygen-containing gas at a temperature in the range of about 150° to 500° F.,
   c. compressing the hardened mixture to from about 80 to 98 percent of its theoretical density,
   d. curing the compressed mixture by heating in a free oxygen-containing gas at a temperature in the range of about 250° to 500° F., and
   e. further treating the cured, compressed mixture with water to hydrate the cement followed by drying the water-treated mixture.

2. A process as defined in claim 1 in which the soil and cement are mixed prior to the addition of the asphalt.

3. A process as defined in claim 1 in which the mixture is hardened by heating in air at a temperature in the range of about 175° to 300° F. for a time period in the range of about 2 minutes to 2 hours.

4. A process as defined in claim 1 in which the mixture is compressed to form about 85 to 95 percent of its theoretical density.

5. A process as defined in claim 1 in which the mixture is cured by heating in air at a temperature in the range of about 350° to 450° F for a time period in the range of about 15 to 40 hours.

6. A process as defined in claim 1 in which the finely divided soil has a particle size less than about 20 mesh.

7. A process as defined in claim 1 in which the Portland cement component is present in about 5 to 20 weight percent, based on the weight of the total composition.

8. A process of claim 1 in which the finely divided soil Portland cement an d asphalt are essentially moisture free.

* * * * *